United States Patent [19]

Gowan, Jr.

[11] Patent Number: 5,043,370

[45] Date of Patent: Aug. 27, 1991

[54] POLYALKYLENE IMIDE OF HIGH BRIGHTNESS AND RETENTION CHARACTERISTICS AND LOW TOXICITY AND METHOD OF INCREASING PAPER WHITENESS

[75] Inventor: John W. Gowan, Jr., Washington, D.C.

[73] Assignee: Westvaco Corporation, New York, N.Y.

[21] Appl. No.: 401,427

[22] Filed: Aug. 31, 1989

[51] Int. Cl.⁵ .................. C08L 1/00; C08C 19/22; C08F 8/32

[52] U.S. Cl. ..................... 524/35; 525/379; 525/382; 428/473.5; 162/162; 162/164.1; 162/164.6

[58] Field of Search ............ 524/35; 528/83, 84, 528/55, 326.1, 327.4, 329.5, 374, 379, 382; 428/473.5; 162/162, 164.1, 164.6

[56] References Cited

U.S. PATENT DOCUMENTS

| Re. 28,541 | 9/1975 | Ryan | 528/49 |
|---|---|---|---|
| 3,821,282 | 6/1974 | Blahak et al. | 560/50 |
| 3,912,697 | 10/1975 | Pacifici | 525/56 |
| 3,933,675 | 1/1976 | Willett | 252/182.15 |
| 3,943,150 | 3/1976 | Kashkina et al. | 549/371 |
| 4,273,873 | 6/1981 | Sugitachi et al. | 435/180 |
| 4,501,767 | 2/1985 | Iimure | 427/44 |
| 4,954,566 | 9/1990 | Gowan, Jr. | 525/61 |

FOREIGN PATENT DOCUMENTS 1696165  11/1974  Fed. Rep. of Germany .
GB1142504  2/1969  United Kingdom .

OTHER PUBLICATIONS

Publication entitled "Fluorescent Compounds and Azo Dyes from Starch Anthranilates", by C. L. Mehlretter, I. & E.C. Prod. Res. 8:77-79 (1969), vol. 8, No. 1, Mar. 1969.

Primary Examiner—Nathan M. Nutter

[57] ABSTRACT

A polyalkylene imide of high brightness and retention characteristics and low biological toxicity comprises a polyalkylene imine having covalently bound thereto at least one residue of a compound of the formula

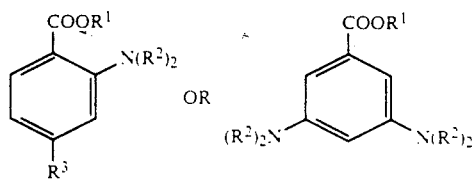

wherein
R¹ is H, ($C_1$-$C_6$)alkyl, ($C_2$-$C_6$) alkenyl, ($C_2$-$C_6$)alkynyl or ($C_1$-$C_6$)alkoxyl;
R² is H, ($C_1$-$C_6$)alkyl, ($C_2$-$C_6$)alkenyl, ($C_2$-$C_6$)alkynyl or ($C_1$-$C_6$)alkoxyl; and
R³ is H or $NR_n$, wherein n is 2 or 3; wherein if n=3 the compound further comprises $X^-$, wherein $X^-$ is an anion. A paper whitening composition and method for whitening cellulosic products comprising a whitening amount of the above imide polymer.

17 Claims, No Drawings

POLYALKYLENE IMIDE OF HIGH BRIGHTNESS AND RETENTION CHARACTERISTICS AND LOW TOXICITY AND METHOD OF INCREASING PAPER WHITENESS

This invention is related to copending U.S. Application Ser. No. 07/347,328, filed on May 5, 1989, entitled "Preparation of Polymers with Pendant organic Moieties Bound thereto via Ester and/or Amide Bridges", U.S. Application Ser. No. 07/426,866, filed on Oct. 26, 1989, entitled "Cellulosic Pulp of High Brightness and Retention Characteristics and Methods of Preparing thereof", U.S. Application Ser. No. 07/401,624 filed on Aug. 31, 1989, entitled "Polyacrylamide Whitener of High Brightness and Retention and Low Toxicity and Method of Increasing Paper Whiteness", and U.S. Application Ser. No. 07/462,231, filed on Jan. 9, 1990, entitled "Quaternary Ammonium Fluorescent the Agent and Method of Using Thereof", and U.S. Application Whitening Agents, Products thereof, Method of Preparing Ser. No. 07/347,260, filed on May 4, 1990, entitled "Fluorescent Whitening Agents, Products Comprising the Agents and Method of Use Thereof", by the present inventors and assignor.

TECHNICAL FIELD

This invention relates to the covalent binding of fluorescent brightners to polyalkylene imine materials. More particularly, this invention relates to the covalent binding of anthranilic acid and derivatives thereof to polyalkylene imine and derivatives thereof. The thus obtained covalently bound polyimide derivatives are suitable for use as whiteners in the manufacture of paper products. These products show high brightness characteristics and substantially no migration of fluorescence out of the product and extremely low biological toxicities. Accordingly, the present imide polymers are suitable for packaging of foodstuffs.

BACKGROUND ART

The successful use of fluorescent brightners on sheets has up to this time relied on the addition of cationic groups to fluorescent molecules, or the utilization of alum sensitive molecules, starch-based fluorescent molecules or polymer-bound fluorescent molecules. (Mehlretter, C.L., I.&E.C. Prod. Res. 8:77–79 (1969); GB Patent No. 1,142,504; DE Patent No. 1,696,165). However, no prior product conveyed to the substrate high fluorescence characteristics as well as excellent retention of the high brightness characteristics, i.e., the fluorescent brightener itself.

U.S. Pat. No. 3,912,697 to Eastman Kodak Co. discloses light sensitive polymers and their use in photographic reproduction. The polymers which form the backbone of the light sensitive polymers include hydroxyl-containing polymers such as cellulose and its partially esterified or etherified derivatives or anthranilic acid polymers such as polyvinyl anthranilate. However, no covalently bound anthranilic acid-cellulose derivatives are mentioned therein.

U.S. Pat. No. 4,273,873 to UNITKA LTD. of Japan discloses and claims a process for preparing an antithrombogenic polymeric material by reacting various compounds including antithrombogenic products, polymeric material such as cellulose or cellulose accetate and an anthranilic acid derivative to cause the various reactants to covalently or ionically bind to the polymeric material. However, the prior art patent does not disclose a product where anthranilic acid or a derivative thereof is covalently bound to a cellulose-type polymer. Moreover, the prior art polymer contains a synthetic fibrinolytic compound pound and a fibrinolytic enzyme, and is intended as antithrombogenic materials. The specific anthranilic acid derivatives suitable for use in the prior art invention are described in columns 3 and 6 of the patent.

U.S. Pat. No. 3,821,282 describes polymerizable anthranilic acid esters obtained by heating acrylic or methacrylic acid esters with isatoic anhydride. The resulting polymers are polymerizable esters. This patent does not mention utility as fluorescent brightening agents.

U.S. Pat. No. 4,501,767 discloses a method for forming multi-coats and discloses reaction products of acrylic compounds and aminobenzoic acids in the preparation of an accelerator. There is mentioned the reaction product or ortho-, meta- or para-aminobenzoic acid with a polymerizable unsaturated carboxylic acid or a polymerizable unsaturated alcohol. No products resulting from this reaction are described as such in the patent. Moreover, there is no suggestion of utility of the reaction product as a fluorescent brighten,er.

U.S. Pat. No. 3,933,675 to Willett discloses improved curing agents having long pot life for use with urethane elastomers. These agents are prepared by reacting in an acid medium orthochloroaniline, an ester of anthranilic acid and formaldehyde in selected molar ratios.

Re 28,541 discloses diamine cured polyurethane compositions with unusually long pot life which cure rapidly at elevated temperatures. The compositions are prepared by combining a prepolymer of di- or polyisocyanate and hydroxy-terminated polyether or polyester of molecular weights 150–3,000 daltons.

U.S. Pat. No. 3,943,150 to Kashkina et al discloses a salt of beta-diethyl aminoethyl ester of p-aminobenzoic acid with the acetal of polyvinyl alcohol and glyoxylic acid. The patent also provides a method of preparing the compound comprising reacting the acetal of polyvinyl alcohol and glyoxylic acid with beta-diethylaminoacetyl ester of p-aminobenzoic acid in an aqueous medium and isolating the desired product from the resulting solution.

Accordingly, there is still a need for improving the brightness characteristics of cellulosic products while at the same time improving their brightness retention and preserving their low toxicity.

DISCLOSURE OF THE INVENTION

This invention related to a polyalkylene imide of high brightness and retention characteristics and low biological toxicity, comprising a polyalkylene imide having covalently bound thereto at least one residue of a compound of the formula

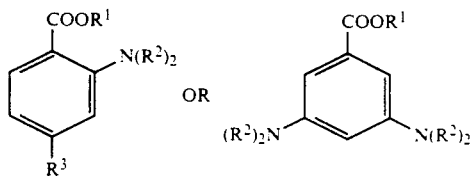

wherein $R^1$ is H, $(C_1-C_6)$alkyl, $(C_2-C_6)$alkenyl, $(C_2-C_6)$ alkynyl or $(C_1-C_6)$alkoxyl;

$R^2$ is H, $(C_1-C_6)$alkyl, $(C_2-C_6)$alkenyl, $(C_2-C_6)$ alkynyl or $(C_1-C_6)$alkoxyl; and $R^3$ is H or $NR_n$, wherein n is 2 or 3; wherein if n=3 the compound further comprises $X^-$ is an anion.

This invention also relates to a paper whitening composition, comprising a whitening amount of the polyalkylene imide of this invention.

Preferred amounts are about 0.001 to 99.99 wt%, more preferably about 1 to 99 wt%, still more preferably about 10 to 90 wt%, and still more preferably about 25 to 75 wt% of the imide of the invention. Other ingredients known in the art of whitening compositions may further be added thereto as well. Typically, other whiteners, preservatives, and the like may be added in amounts known in the art.

Also part of this invention is a cellulosic product of high brightness and retention characteristics and low biological toxicity which comprises the polyalkylene imide described above. Typically, the whitener may be added to the paper ingredients and/or it my be coated onto the paper.

This invention also related to a food product packaged with a cellulosic product whitened with the polyalkylene imide of this invention.

A method is disclosed herein for increasing the brightness and retention characteristics of a cellulosic pulp while preserving its low biological toxicity comprising adding thereto a whitening amount of the polyalkylene imide of this invention.

Also provided herein is a method of increasing the whiteness and retention characteristics of a cellulosic product while preserving its low biological toxicity, comprising adding to the paper ingredients a whitening amount of a polyalkylene imide having covalently bound thereto at least one residue of the compound of the formula

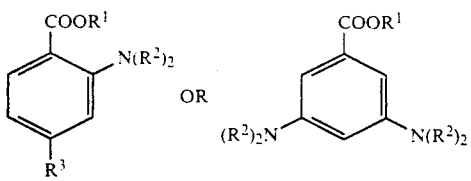

wherein $R^1$ is H, $(C_1-C_6)$alkyl, $C_2-C_6)$alkyl, $(C_2-C_6)$alkenyl or $(C_1-C_6)$ alkoxyl;

$R^2$ is H, $(C_1-C_6)$alkenyl, $(C_2-C_6)$alkenyl, $(C_2-C_6)$ alkynyl or $(C_1-C_6)$alkoxy; and $R^3$ is H or $NR_n$, wherein n is 2 or 3: wherein if n=3 the compound further comprises $X^-$; wherein $X^-$ is an anion: and forming said cellulosic product.

A method is also provided for increasing the brightness and retention characteristics of a cellulosic product while preserving its low biological toxicity, comprising adding to the paper ingredients a whitening amount of a polyalkylene imide having covalently bound thereto at least one residue of the compound of the formula

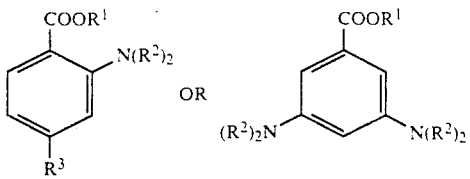

wherein $R^1$ is H, $(C_1-C_6)$alkenyl, $(C_2-C_6)$alkenyl, $(C_2-C_6$alkynyl or $(C_1-C_6)$alkoxyl;

$R^2$ is H, $(C_1-C_6)$alkyl, $(C_2-C_6)$alkenyl, $(C_2-C_6)$alkenyl or $(C_1-C_6)$alkoxyl; and $R^3$ is H or $NR_n$, wherein n is 2 or 3 wherein if n=3 the compound further comprises $X^-$, wherein $X^-$ is an anion; and forming said cellulosic product.

A method is also provided for increasing the brightness and retention characteristics of a cellulosic product while preserving its low biological toxicity, which comprises coating a cellulosic product with a whitening amount of of a polyalkylene imine having covalently bound thereto at least one and up to about 1,000 residues of a compound of the formula

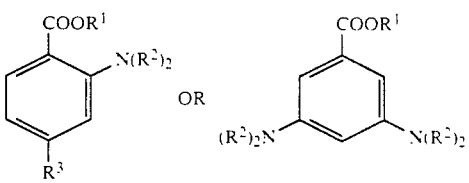

wherein $R^1$ is H, $(C_1-C_6)$alkyl, $(C_2-C_6)$alkenyl, $(C_2-C_6)$alkynyl or $(C_1-C_6)$alkoxyl:

$R^2$ is H, $(C_1-C_6)$alkyl, $(C_2-C_6)$alkenyl, $(C_2-C_6)$alkynyl or $(C_1-C_6)$alkoxyl: and $R^3$ is H or $NR_n$, wherein n is 2 or 3; wherein if n=3 the compound further comprises $X^-$, wherein $X^-$ is an anion.

Other objects, advantages and features of the present invention will become apparent to those skilled in the art from the following discussion.

BEST MODE FOR CARRYING OUT THE INVENTION

This invention results from a desire to improve on prior art technology intended to provide products capable of increasing the brightness of cellulosic products as well as their retention characteristics. In addition the present invention further decreases the low biological toxicity of fluorescent compounds utilized in the formation of the present whitening agents.

In the present invention, a fluorescent material, i.e., an anthranilic acid or derivative thereof, is covalently attached to a polyalkylene imine and then either incorporated into pulp fibers which are subsequently utilized in the manufacture of paper products or coated onto a finished cellulosic product.

The higher the level of addition of the fluorescent compound to the polyalkylene imine the higher the brightness achieved by covalently binding the two to form an imide bond. This covalent binding also decreases the migration capacity of the fluorescent material in the cellulosic product, even under harsh conditions. The products provided herein are accordingly high in brightness characteristics and low in brightness leaching characteristics and biological toxicities.

A polyalkylene imide whitener of high brightness and retention and low biological toxicity is provided herein, which comprises A polyalkylene imine having covalently bound thereto at least one and up to about 1000 residues of a compound of the formula

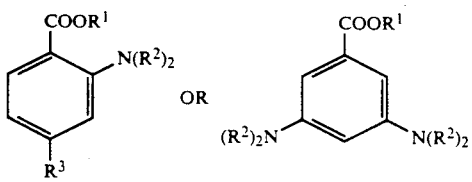

wherein

R[1] is H, $(C_1-C_6)$alkyl, $(C_2-C_6)$alkenyl, $(C_2-c_6)$alkynyl or $(C_1-C_6)$alkoxyl;

R[2] is H $(C_1-C_6)$alkyl, $(C_2-C_6$alkenyl, $(C_2-C_6)$alkynyl or $(C_1-C_6)$alkoxyl; and R[3] is H or $NR_n$, wherein n is 2 or 3: wherein if n=3 the compound further comprises $X^-$, wherein $X^-$ is an anion.

The polyalkylene imide whitener of the invention may, in addition to the polyalkylene imide polymer, comprise other ingredients. Suitable ingredients are other whiteners such as 4,4'-diaminostilbene-2,2' disulphonic acid derivatives, among others, which are known in the art. Examples of other ingredients and/or additives are dispersants, surfactants, solvents, and buffers. However, other additives and/or ingredients may also be incorporated into the polyalkylene imide whitener of the invention in amounts which will be known by an artisan.

The polyalkylene imide whitener of the invention may suitably be poly $(C_2-C_8)$alkylene imide, derivatives thereof, co-polymers thereof with $(C_2-C_8)$alkylenes, styrene, α-methylstyrene, derivatives thereof and salts thereof capable of forming a covalent bond with the above compound. More specifically, any of the above polymers may contain further reactive groups which are capable of reacting with the anthranilic acid derivatives to form a covalent bond. Typical reactive groups are alcohol, amine, ester and anhydride. However, other reactive groups may also be incorporated thereto.

Preferred polyalkylene imides are poly $(C_2-C_8)$alkylene amides. Still more preferred are polyethylene imide and polypropylene imide The most preferred imide is polyethylene imide, which typically has an average molecular weight of about 100 to 100,000 daltons, and more preferably about 10,000 to 20,000 daltons.

Suitable polymers are linear or branched polymers, and optionally cross-linked polymers. The polymers typically will have an average molecular weight of about 1000 to 100,000 daltons, and more preferably about 10,000 to 20,000 daltons. However, any polymer suitable for the preparation of a paper-like product may be utilized within the confines of this invention.

In the case where the anthranilic acid derivative is a quaternary ammonium salt, it is accompanied by an anion. Suitable anions are known in the art but some examples are halides, nitrates, phosphates, and sulfates. However, other anions may also be utilized.

The proportion of residues of the compound which are covalently bound to the polyalkylene imine may vary significantly. In fact, any number of residues may be covalently bound to the polymer. Clearly, at least one residue is necessary and up to about 1000 residues of the compound may also be incorporated per molecule of polymer. Preferred are about 50 to 1000 residues, and still more preferred are about 50 to 1000 residues per molecule of polymer. This number may clearly vary depending on the average molecular weight and other characteristics of the polymer, such as the number of reactive moieties present therein. In fact, the upper limit for the number of residues which may be covalently bound to the polymer is given by the number of reactive groups present in the polymer.

In a preferred embodiment of the invention, the compound is selected from the group consisting of

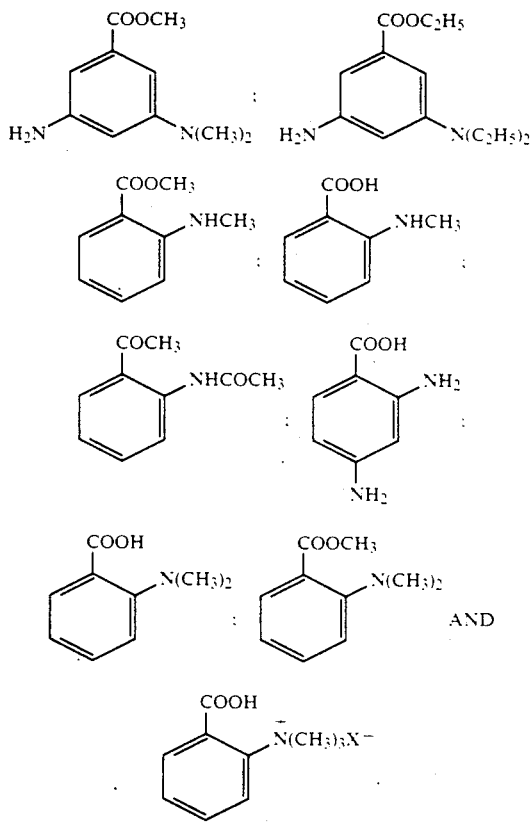

In still another preferred embodiment, the compound is selected from the group consisting of

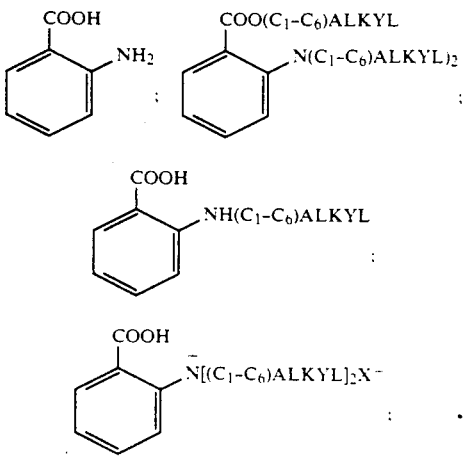

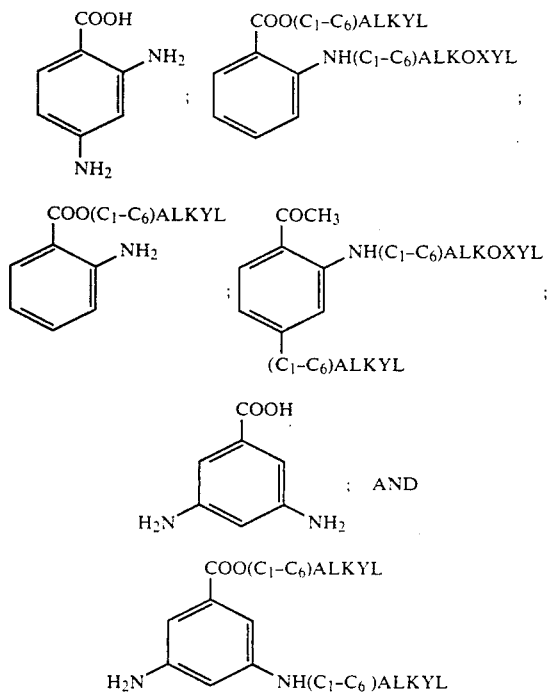

In still a most preferred embodiment, the compound is anthranilic acid.

Another preferred embodiment of the present product consists essentially of the polyalkylene imine polymer having bound thereto at least one and up to about 1000 residues of the above compound.

Another preferred embodiment is that where the polyalkylene imide further comprises a linker which is covalently bonded to both the polymer and the compound. Suitable linkers are known in the art as well as methods for covalently binding them to the polymer and the reactive groups of compounds such as anthranilic acid and derivatives thereof. Suitable linkers are epichlorohydrine and 3-chloro-1-propanol.

However, other linkers may also be utilized within the confines of this invention.

A paper whitening composition is also provided herein which comprises a whitening amount of a polyalkylene imide comprising a polyalkylene imine having covalently bound thereto at least one and up to about 1000 residues of a compound of the formula

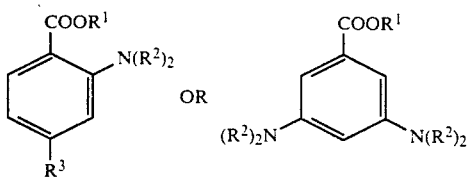

wherein
$R^1$ is H, $(C_1-C_6)$alkyl, $(C_2-C_6)$ alkenyl, $(C_2-C_6)$alkynyl or $(C_1-C_6)$alkoxyl;
$R^2$ is H, $(C_1-C_6)$alkyl, $(C_2-C_6)$alkenyl, $(C_2-C_6)$alkynyl or $(C_1-C_6)$alkoxyl; and
$R^3$ is H or $NR_n$, wherein n is 2 or 3; wherein if $n=3$ the compound further comprises $X^-$, wherein $X^-$ is an anion.

Part of this invention is a composition comprising a whitening amount to the imide of the invention. The composition may further comprise other whiteners and/or other additives, known in the art in amounts known in the art.

Preferred amounts are about 0.001 to 99.99 wt%, more preferably about 1 to 99 wt%, still more preferably about 10 to 90 wt%, and still more preferably about 25 to 75 wt% of the imide of the invention. Other ingredients known in the art of whitening compositions may be further added thereto in amounts also known. Typically other whiteners, preservatives, and the like may be added.

Preferably, the polyalkylene imide and/or the above composition are added in an amount of about 0.0001 to 1 wt% of the imide to the cellulosic ingredients, and more preferably about 0.01 to 0.1 wt% of the ingredients. When coated onto a finished cellulosic product the composition may be sprayed, roll coated, or dipped, among other methods. Typically, it will be coated in an amount of about 0.01 to 0.1 wt% of the cellulosic product. The composition may be in solid, liquid or aerosol form. Carriers for these are known in the art. The coating methods are standard in the art and need not be further described herein.

Also provided herein is a cellulosic product of high brightness and retention characteristics and low biological toxicity which comprises the polyalkylene imide of this invention. Examples of cellulosic products are sheets of paper, board, pulp and fillers, for various uses.

The cellulosic product may typically comprise cellulose ingredients such as in the form of cellulosic pulp and a whitening amount of the polyalkylene imide of this invention. In one preferred embodiment, the acrylic acid may be co-polymerized with cellulose by methods known in the art and the fluorescent compound then bound thereto.

Methods for undertaking the preparation of the polyalkylene imide are known in the art and can suitably be modified by an artisan for utilization of the present polymeric whitener.

Also provided herein is a food product packaged with the whitened cellulosic product disclosed herein. The present products are particularly suited for use in the food industry since anthranilic acid and its derivatives are known to have substantially no biological toxicity. Their buildup to large polymers further decreases this low toxicity. Typically, the food products may be dry or moist.

Another method is also provided herein for increasing the brightness and retention characteristics of a cellulosic product while preserving its biological toxicity, which comprises
coating a cellulosic product with a whitening amount of a polyalkylene imine having covalently bound thereto at least one and up to about 1000 residues of a compound of the formula

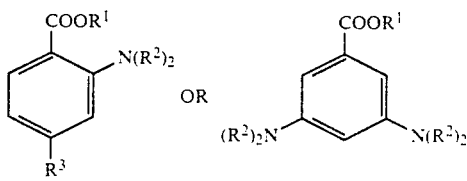

wherein
$R^1$ is H, $(C_1-C_6)$alkyl, $(C_2-C_6)$alkenyl, $(C_2-C_6)$alkynyl or $(C_1-C_6)$alkoxyl;

$R^2$ is H $(C_1-C_6)$alkyl, $(C_2-C_6)$alkenyl, $(C_2-C_6)$alkenyl or $(C_1-C_6)$alkoxy; and $R^3$ is H or $NR_n$, wherein n is 2 or 3; wherein if n=3 the compound further comprises $X^-$, wherein $X^-$ is an anion.

Another method provided herein is one for increasing the brightness and retention characteristics while lowering the biological to toxicity of a compound of the formula

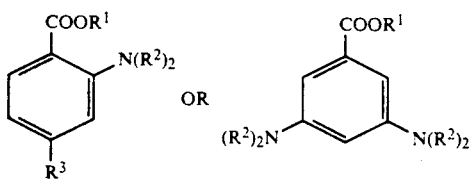

wherein $R^1$ is H, $(C_1-C_6)$alkyl, $(C_2-C_6)$alkenyl. $(C_2-C_6)$alkynyl or $(C_1-C_6)$alkoxyl;

$R^2$ is H $(C_1-C_6)$alkyl, $(C_2-C_6)$alkenyl, $(C_2-C_6)$alkynyl or $(C_1-C_6)$alkoxyl; and $R^3$ is H or $NR_n$, wherein n is 2 or 3; wherein if n=3 the compound further comprises $X^-$, wherein $X^-$ is an anion, said method comprising covalently binding at least one and up to about 1000 residues of said compound.

The polyalkylene imide whitener of this invention can be prepared by methods known in the art.

Typically, they may be prepared by a method which comprises contacting the compound disclosed hereinabove with a polyalkylene imine in an amount preferably about 10:1 to 1:1 molar equivalents, and more preferably about 7:1 to 5:1 molar equivalents, under conditions effective to form an imide thereof, and separating the imide from the reaction mixture.

The contacting step may be conducted at a temperature of about 50° to 150° C., more preferably about 75° to 110° C., and optionally in the presence of an organic solvent, e.g., toluene, benzene, and xylene, mixtures thereof or mixtures with other solvents. The separation of the polyalkylene imide from the remainder of the reactants and/or solvent may be conducted by decantation, filtration and/or centrifugation, among other technologies, which are known in the art.

The compound may have any amine or imine groups protected as is known in the art. The protective groups may be selected from the group consisting of acetyl, propanyl, butyryl, and BOC. However, other protective groups may also be utilized.

Also provided herein is a method of whitening cellulosic pulp which comprises reacting the compound with the polyethylene imine in amounts of about 10:1 to 1:1 molar equivalents under conditions effective to form a polyimide thereof and free water, separating said polyimide from the reactants, and further adding a whitening amount of the polyimide whitener to cellulosic pulp ingredients. Methods of preparing cellulosic pulp are known in the art.

In a particularly preferred embodiment of the invention, the compound is reacted with the polyalkylene imine in amounts of about 10:1 to 1:1 molar equivalents at a temperature of about 75° to 150° C., and optionally in the presence of a solvent such as an organic solvent, e.g., toluene, benzene, and xylene, mixtures thereof or mixtures with other solvents. The separation of the imide polymer from the reactants may be conducted by the same methods described above.

Typically, the solvent is an organic solvent and the separation of the imide polymer from the water is conducted by centrifugation. Further steps of washing and drying may be conducted and the polymer may then be stored.

Also provided is a method of increasing the brightness and retention characteristics of a cellulosic pulp while preserving its low biological toxicity which comprises adding to the pulp a whitening amount of a polyalkylene imine having bound thereto at least one and up to about 1000 residues of a compound as described above. Preferred amounts added are those described above.

The whitening composition comprising, the polyalkylene imide whitener of the invention may further comprise other ingredients and/or additives such as whiteners and the like which are known in the art and are added in amounts also known in the art.

This invention also encompasses a method of increasing the brightness and retention characteristics of a cellulosic product while preserving its low biological toxicity, which comprises coating onto the cellulosic product a whitening amount of the polyalkylene imide of the invention.

The conditions for practicing this method are known in the art. The whitener may be coated by spraying, dipping, roll coating and the like.

In a preferred embodiment of the above methods the cellulosic product may be further printed and utilized for wrapping and/or packaging, such as when applied to the wrapping and/or packaging of a food product.

A food product is also part of this invention. This product is packaged with the whitened cellulosic product of the invention. Typical food products are moist and dry food products.

In a preferred embodiment of this invention the present polyalkylene imide whiteners are prepared in a acidic medium at reflux, typically at temperatures of about to 150° C., and more preferably about 75° to 110° C. Examples of the acid are p-toluene sulfonic acid and the like. Having now generally described this invention, the same will be better understood by reference to certain specific examples, which are included herein for purposes of illustration only and are not intended to be limiting of the invention or any embodiment thereof, unless so specified.

EXAMPLES

EXAMPLE 1:

Preparation of Polyethylene imineanthranilic imide.

5 g of polyethylene imine and 1 g of anthranilic acid are allowed to react to reflux for about 12 hrs in 500 ml toluene in the presence of p-toluene sulfonic acid. The resultant polyethylene- anthranilic imide is washed to remove unreacted anthranilic acid and solvent.

The thus obtained polyethylene-anthranilic imide is then incorporated along with cellulosic pulp into hand sheets and it is determined that they are fluorescent.

EXAMPLE 2

Demonstration of High Fluorescence and Retention Characteristics of the Imide Polymer of the Invention The derivatized polyethylene-anthranilic imide obtained in Example 1 is formed with cellulosic pulp into a hand sheet. It is determined to be fluorescent prior to being subjected to any treatment. A first group of hand sheets produced by the method of Example 1 is subjected to caustic treatment with 2 ml of 0.1 N NaOH for 24 hours.

A second group of hand sheets prepared by the process of Example 1 is subjected to solvent extraction with methanol.

After the hand sheets are subjected to the two treatments described above, they are allowed to dry and are then tested for fluorescence.

All the sheets kept at least 50% of the original fluorescence. The cellulosic products produced in accordance with the present invention are stable to caustic treatment and to solvent extraction.

EXAMPLE 3

Paper Product Coated with Polyethyleneanthranilic Imide

Portions of various filter paper sheets are dipped in an aqueous solution containing 1 wt% polyalkyleneanthranilic imide and dried.

The filter papers are washed each with 250 ml of water and then dried.

No fluorescence is observed into the non-dipped areas.

Thus, the present polyalkylene imides have a high retention capability when coated onto cellulosic products.

The invention now being fully described, it will be apparent to one of ordinary skill in the art that many changes and modifications can be made thereto without departing from the spirit or scope of the invention as set forth herein.

What is claimed is:

1. A poly ($C_2$-$C_8$) alkylene imide of high brightness and retention characteristics and low biological toxicity, comprising
   a polyalkylene imine having covalently bound thereto at least one residue of a compound of the formula

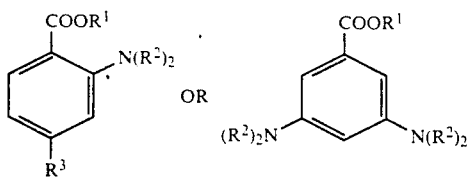

wherein
   $R^1$ is H, ($C_1$-$C_6$)alkyl, ($C_2$-$C_6$)alkenyl, ($C_2$-$C_6$)alkynyl or ($C_1$-$C_6$)alkoxyl;
   $R^2$ is H, ($C_1$-$C_6$)alkyl, ($C_2$-$C_6$)alkenyl, ($C_2$-$C_6$)alkynyl or ($C_1$-$C_6$)alkoxyl; and
   $R^3$ is H or $NR_n$, wherein n is 2 or 3; wherein if n=3 the compound further comprises $X^-$, wherein $X^-$ is an anion.

2. The polyalkylene imide of claim 1 having an average molecular weight of about 1000 to 100,000 daltons.

3. The polyalkylene imide of claim 1, wherein the imine polymer is selected from the group consisting of poly ($C_2$-$C_6$) alkylene imine, derivatives, thereof, copolymers thereof with ($C_2$-$C_6$)alkylenes, styrene, methylstyrene and derivatives thereof capable of forming a covalent bond with a compound of said formula.

4. The polyalkylene imide of claim 1, wherein the compound is selected from the group consisting of

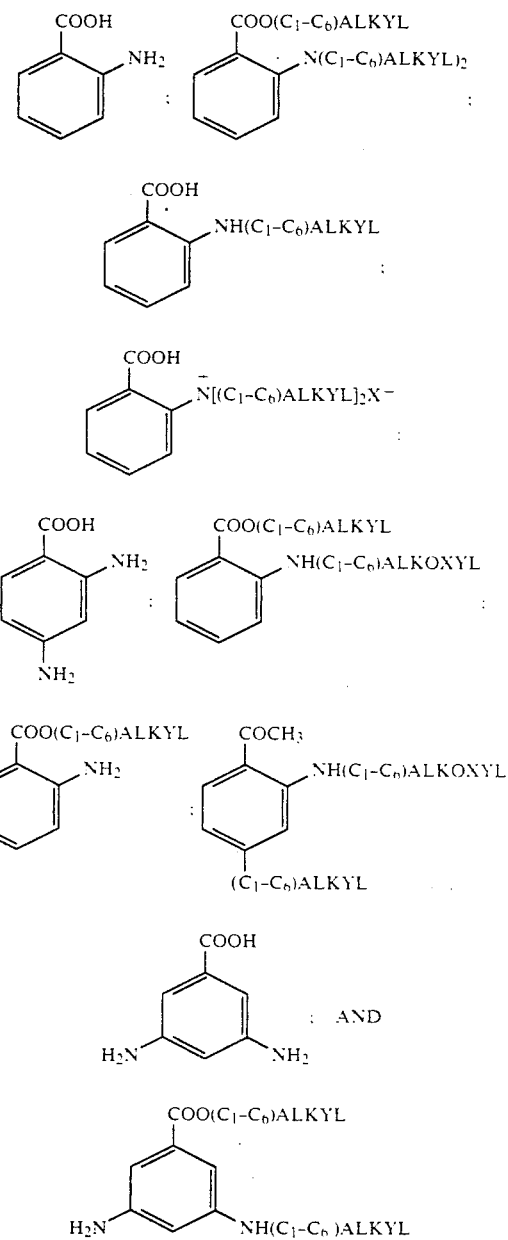

5. The polyalkylene imide of claim 4, wherein the compound is selected from the group consisting of

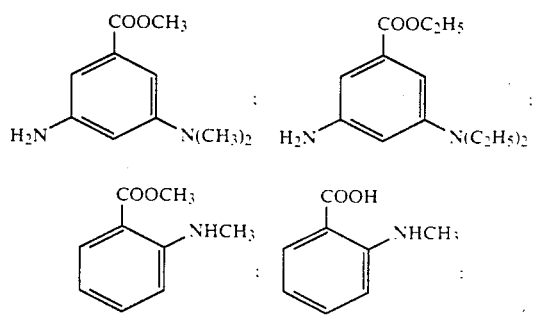

-continued

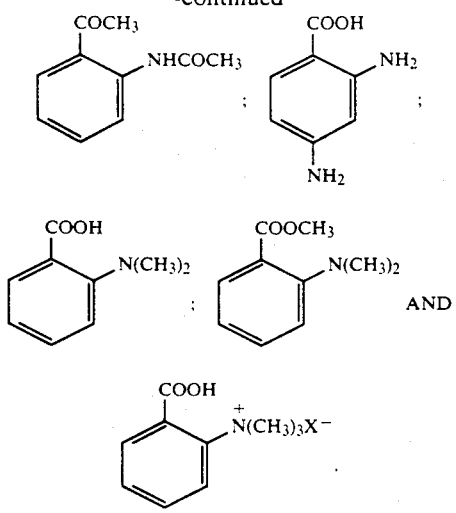

6. The polyalkylene imide of claim 5, wherein the compound is anthranilic acid.

7. The polyalkylene imide of claim 1, wherein the imine polymer has covalently bound thereto at least one and up to about 1000 residues of the compound per molecule.

8. The polyalkylene imide of claim 1 consisting essentially of said polymine having bound thereto said compound.

9. A paper whitening composition, comprising a whitening amount of the imide polymer of claim 1.

10. A cellulosic product of high brightness and retention and low biological toxicity, comprising the polyalkylene imide of claim 1.

11. The cellulosic product of claim 10, wherein the imide polymer is coated onto the product.

12. The cellulosic product of claim 10, wherein the imide polymer is mixed with the cellulosic ingredients prior to forming the product.

13. A food product packaged with the cellulosic product of claim 10.

14. A method of increasing the brightness and retention characteristics of a cellulosic product while preserving its low biological toxicity, comprising
coating a cellulosic product with a whitening amount of a polyalkylene imide having covalently bound thereto at least one and up to 1,000 residue of a compound of the formula

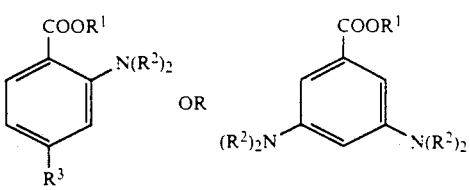

wherein
$R^1$ is H, $(C_1-C_6)$alkyl, $(C_2-C_6)$alkenyl, $(C_2-C_6)$alkenyl, $(C_2-C_6)$ alkynyl or $(C_1-C_6)$alkoxyl;
$R^2$ is H, $(C_1-C_6)$alkyl, $(C_2-C_6)$alkenyl, $(C_2-C_6)$alkynyl or $(C_1-C_6)$alkoxyl; and
$R^3$ is H or $NR_n$, wherein n is 2 or 3; wherein if n=3 the compound further comprises $X^-$, wherein $X^-$ is an anion.

15. The method of claim 14, wherein the imide polymer is added in an amount of about 0.0001 to 1 wt% of the paper ingredients.

16. A method of increasing the brightness and retention characteristics of a cellulosic product while preserving its low biological toxicity, comprising
adding to the paper ingredients a whitening amount of a polyalkylene imide having covalently bonded thereto at least one and up to 1000 residue of the formula

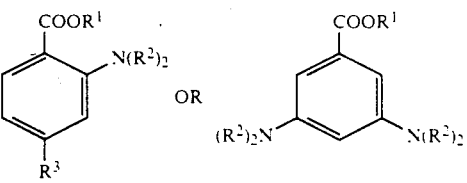

wherein
$R^1$ is H, $(C_1-C_6)$alkyl, $(C_2-C_6)$alkenyl, $(C_2-C_6)$alkynyl or $(C_1-C_6)$alkoxyl;
$R^2$ is H, $(C_1-C_6)$alkyl, $(C_2-C_6)$aklenyl, $(C_2-C_6)$alkynyl or $(C_1-C_6)$alkoxyl; and
$R^3$ is H or $NR_n$, wherein N is 2 or 3; wherein if n=3 the compound further comprises $X^-$, wherein $X^-$ is an anion.

17. The method of claim 16, wherein the imide polymer is added in an amount of about 0.001 to 0.1 wt% of the paper ingredients.

* * * * *